United States Patent [19]

Stubits et al.

[11] 4,397,872

[45] Aug. 9, 1983

[54] HIGH GRAVITY BREWING USING LOW GEL POINT RICE ADJUNCTS

[75] Inventors: Marcella C. Stubits, St. Louis; James Teng, St. Louis County; Barrett L. Scallet, Clayton, all of Mo.

[73] Assignee: Anheuser-Busch, Incorporated, St. Louis, Mo.

[21] Appl. No.: 285,624

[22] Filed: Jul. 21, 1981

[51] Int. Cl.³ .......................... C12C 11/00; C12C 7/04
[52] U.S. Cl. ......................................... 426/16; 426/29
[58] Field of Search ............................. 425/11, 16, 29

[56] References Cited

U.S. PATENT DOCUMENTS 4,140,799  2/1979  Nagodamithand et al. ......... 426/11

FOREIGN PATENT DOCUMENTS 880875  9/1971  Canada .................................. 426/29

OTHER PUBLICATIONS

Pollock, J. R. A., Brewing Science, vol. 1, Academic Press, N.Y. 1979 (pp. 268-270).
Rose, A. H., Alcoholic Beverages, Economic Microbiology, vol. 1, Academic Press, N.Y., 1977 (pp. 50-51).

*Primary Examiner*—David M. Naff
*Attorney, Agent, or Firm*—Gravely, Lieder & Woodruff

[57] ABSTRACT

Beer brewed from malted barley and having a rice adjunct can be produced at higher gravity cold wort concentrations without excessive viscosity build-up by using low gel point rice.

5 Claims, No Drawings

HIGH GRAVITY BREWING USING LOW GEL POINT RICE ADJUNCTS

BACKGROUND OF THE INVENTION

This invention relates to an improved method of brewing beer from barley or malted barley and rice by using low gel point rice.

In the brewing of beer by using barley or malted barley and rice, one mixes a main mash of malted barley and water, syphons a part of that mash into a rice cooker where the enzymatic action of the malt works to partially break down the starches in the rice while heating takes place in the presence of water, then pumps the partially converted rice slurry into the main mash tank where the mashing is completed. The insolubles of the mash are then permitted to settle to the bottom of the tank and the remaining solution or wort is strained through the insolubles, which are then sparged or washed and carried to the brew kettle, where sterilization by boiling and addition of hops takes place. The boiled wort is then cooled and aerated in preparation for primary fermentation.

In the past, it has been necessary to maintain sufficiently high levels of water in the main mash and the rice cooker that the materials have workable viscosities. Otherwise, problems develop such as drive motors to the rice cooker and masher agitation units continually stalling, as well as pumps throughout the system being overloaded.

The cumulative effect of these problems is a limited brewing capacity. That is, the gravity or percent solids of the wort cannot be increased appreciably over, for example, 15% in a given system, without encountering difficulty. This solids concentration is alternatively measured in what are called degrees of Balling. For our purposes, a degree of Balling will be used to mean a percent solids in the wort.

The brewing of beer with a rice adjunct is, for the above reasons, as well as for reasons of raw material cost, a more expensive process than brewing with other adjuncts such as corn.

SUMMARY OF THE INVENTION

It is a main object of this invention to brew beer from malted barley and rice at the higher cold wort gravity of 16° Balling or higher without cumbersome and expensive equipment modifications and without excessive viscosity.

This object and other objects of the invention, which will become apparent from the reading of this specification and the associated claims, are made possible by the use of rice varieties having a gel point of 70° C. or less. The gel point is defined as the temperature of the first rapid increase in viscosity and is measured by Brabender Visco/Amylo/Graph. That is to say, the rice is ground so that at least 25% of the material goes through 13 mil mesh size. One hundred grams (on a dry basis) of the flour is added to a 600 ml. beaker. Then 375 ml. distilled water is added, the pH adjusted to 6.0, then the weight is adjusted up to 500 grams with distilled water. The slurry is homogenized for about 1.5 minutes on a Lourdes homogenizer with the Variac set at 20. The pH is rechecked to be 6.0, and the material is thereafter immediately transferred to a Brabender cup. The Brabender is started and heating is maintained at 1.5° C. per minute until the maximum viscosity is reached.

DETAILED DESCRIPTION

Regular brew rice is usually a mixture of different rice varieties and may contain a large percentage of long grain, high gel point, varieties such as Le Belle, Le Bonnet and Starbonnet. The gel point of such rices previously was not of concern but is as high as 76° C.

With our discovery that paste viscosity in rice cooker is directly related to the gel point of the rice and that gel points of 70° C. or less can facilitate cold wort gravities of 16° Balling or higher, the useful rices of this invention become varieties such as Mochi Gomi, Brazos, Nortai, Nato and Mars. This is especially surprising in the case of certain of these rices such as the waxy rice varieties (Mochi Gomi), which are known to have such high viscosity developments that they are used as food thickeners and therefore do not seem likely to lend themselves to high gravity brewing and resolving the resultant viscosity problems. Other short or medium grain rices, naturally occurring, mutated, or even hybrids may also be useful. The gel points of rices of this invention usually range between 70° C. and 63° C. or lower. The rice varieties of this invention may be used alone or in combination with one another, or even with minor amounts of higher gel point rices, so long as the combined gel point does not exceed 70° C.

The improvement obtained by substituting low gel point rice for regular brew rice in high gravity brewing is illustrated in the following examples:

Production of High Gravity Wort Using Low Gel Point Rice Adjunct

EXAMPLE I

Preparation of 16° B Wort from Mochi Gomi Rice

Two rice adjunct brews were made in the brewhouse under identical conditions except the following:

|  | Brew A | Brew B |
|---|---|---|
| Malt, lbs. | 24710 | 26355 |
| Rice, lbs. | 10590 | 11295 |
| Rice, Kind | Brew Rice from routine shipment | Mochi Gomi |

Rice gel point was determined on a Visco Amylo Graph Brabender. Rice paste viscosity was determined on a Brookfield RV Viscometer at the end of the cooking cycle.

|  | Brew A | Brew B |
|---|---|---|
| Cold Wort Concentration | 15.0° B. | 16.0° B. |
| Rice Gel Point | 75° C. | 64° C. |
| Rice Paste Viscosity | 3080 cps | 80 cps |

Rice paste viscosity is not a limiting factor in the production of high gravity wort from Mochi Gomi Rice as exhibited by the very low rice paste viscosity in Brew B. It is therefore apparent that higher concentrations than 16° B could be achieved without surpassing the 3080 cps. of a regular brew.

Production of High Gravity Wort Using Low Gel Point Rice Adjunct

EXAMPLE II

Preparation of 16° B Wort from Nortai Rice

Two rice adjunct brews were made in the brewhouse under identical conditions except the following:

|  | Brew A | Brew B |
|---|---|---|
| Malt, lbs. | 21350 | 22750 |
| Rice, lbs. | 11350 | 12100 |
| Rice, kind | Brew rice from routine shipment | Nortai |

Rice gel point and paste viscosity were determined as described in Example I.

|  | Brew A | Brew B |
|---|---|---|
| Cold Wort Concentration | 15.0° B. | 16.0° B. |
| Rice Gel Point | 75° C. | 69° C. |

The use of Nortai rice at 16° B presented no additional torque on the cooker agitator. The power consumption record showed no extra load on the agitator.

What is claimed is:

1. In a method of brewing beer wherein wort is produced from a mash consisting essentially of water, malt, and a substantial amount of rice as an adjunct, and the malt is present in a greater amount than the rice, the improvement comprising using as said rice, strains of rice having a gel point of 70° C. or less, and using increased amounts of malt and rice in direct proportions in the mash to obtain a wort having a cold wort concentration of 16° Balling or higher to produce a high gravity beer, said cold wort concentration of 16° Balling or higher resulting solely from the increased amounts of malt and rice in the mash.

2. The method of claim 1 wherein the strain of rice used has a gel point of from about 63° C. to 70° C.

3. The method of claim 1 wherein the strain of rice used is selected from a group consisting essentially of Mochi Gomi, Brazos, Nortai, Nato and Mars.

4. The method of claim 1 wherein the rice used is Mochi Gomi.

5. The method of claim 1 wherein the rice used is Nortai.

* * * * *